2,713,578
Patented July 19, 1955

2,713,578
PENICILLIN SALT OF 2-AMINOTETRAHYDROPYRIDINE

Vernon V. Young, Terre Haute, Ind., assignor to Commercial Solvents Corporation, Terre Haute, Ind., a corporation of Maryland No Drawing. Application August 27, 1954,
Serial No. 452,737

2 Claims. (Cl. 260—239.1)

My invention relates to salts of penicillin and more particularly it relates to the penicillin salt of 2-aminotetrahydropyridine.

All penicillin salts are not practical for therapeutic use. For example, a penicillin salt may not be stable at ordinary temperatures and thus in order for the therapeutic activity of the salt to be retained, it must be refrigerated during storage or else rapid deterioration of the therapeutic activity occurs. Some penicillin salts are too toxic for use therapeutically and hence must be ruled out completely.

In addition to the stability and toxicity characteristics of penicillin salts, consideration must also be given to their solubility properties. The expression of favorable solubility properties is found in the measurement of blood levels of the penicillin at intervals after injection into or ingestion by the body. The longer penicillin can be found in the blood after it has been placed in the body, the more effective it is against pathogenic organisms present in the body, provided they are penicillin susceptible. If, however, higher blood levels of penicillin are only maintained for short periods after injection or ingestion of the penicillin salts, the penicillin content of the salt is largely wasted and there is little or no alleviation of the pathologic condition being treated unless there are repeated administrations of the penicillin at short intervals.

The object of the present invention is to provide a stable penicillin salt composition of low toxicity which gives prolonged blood levels of penicillin upon administration.

I have now discovered a stable penicillin salt possessing low toxicity characteristics which gives prolonged blood levels after being injected into the body. My new composition is the penicillin salt of 2-aminotetrahydropyridine.

My new composition can be prepared by mixing one equivalent of a water-soluble penicillin salt such as potassium penicillin in aqueous solution with one equivalent of 2-aminotetrahydropyridine hydrochloride in aqueous solution. 2-aminotetrahydropyridine can be obtained by catalytically hydrogenating 2-aminopyridine in acetic acid according to the method of Grave, Journal of the American Chemical Society, volume 46, page 1460 (1924). The penicillin salt of 2-aminotetrahydropyridine precipitates in crystalline form from the aqueous solution, is recovered therefrom by filtration and dried. The new salt has a potency of 1421 units of penicillin per mg., a melting point of 135–140° C. with decomposition, and a solubility of 1.23 grams in 25 ml. of water at room temperature. My new penicillin salt has a specific rotation of $[\alpha]_{Hg}^{25} = +266°$, C=0.1 gram in 10 ml. of 50% acetone, L=1 dm.

Blood level tests have been conducted wherein my new penicillin salt of 2-aminotetrahydropyridine was injected intramuscularly into dogs, the amount of penicillin in the blood stream being measured at definite intervals after administration. The following table shows the blood levels obtained when my new composition was injected intramuscularly as an aqueous suspension, 60,000 units of penicillin being injected into each dog.

TABLE I

[Intramuscularly-aqueous suspension—60,000 u/dog.]

| Dog No. | Units Penicillin/ml. Serum, Hours | | | | | | |
|---|---|---|---|---|---|---|---|
| | 0 | 1 | 2 | 4 | 6 | 12 | 24 |
| 18 | 0 | .320 | 1.05 | .910 | .680 | .425 | 0 |
| 0 | 0 | .590 | .525 | .620 | .500 | .350 | 0 |
| 39 | 0 | .352 | .280 | .600 | .665 | .430 | .070 |
| 822 | 0 | .480 | .665 | .650 | .680 | .212 | 0 |

The following table shows the results of toxicity tests on my new compound, the tests having been conducted on laboratory mice. The table shows the amount of my new compound which can be administered without any mouse fatalities, the amount given to produce a 50% kill of the mice tested, and the amount required to give a 100% kill of the mice tested. The penicillin salt was injected intraperitoneally in the mice.

TABLE II

*Toxicity*

Mg. of salt/kg. of body weight

| | |
|---|---|
| $LD_0$ | 200 |
| $LD_{50}$ | 318±37 |
| $LD_{100}$ | 500 |

My new compound is a therapeutically effective veterinary compound and is useful in treating diseases in animals caused by penicillin susceptible organisms.

Now having disclosed my invention, what I claim is:

1. The penicillin salt of 2-aminotetrahydropyridine.
2. A therapeutic composition in dosage form comprising the penicillin salt of 2-aminotetrahydropyridine.

No references cited.